Dec. 17, 1963
C. H. HARRIS
3,114,285
AUTOMATIC SLIDE CENTERING
Filed May 29, 1957
3 Sheets-Sheet 1
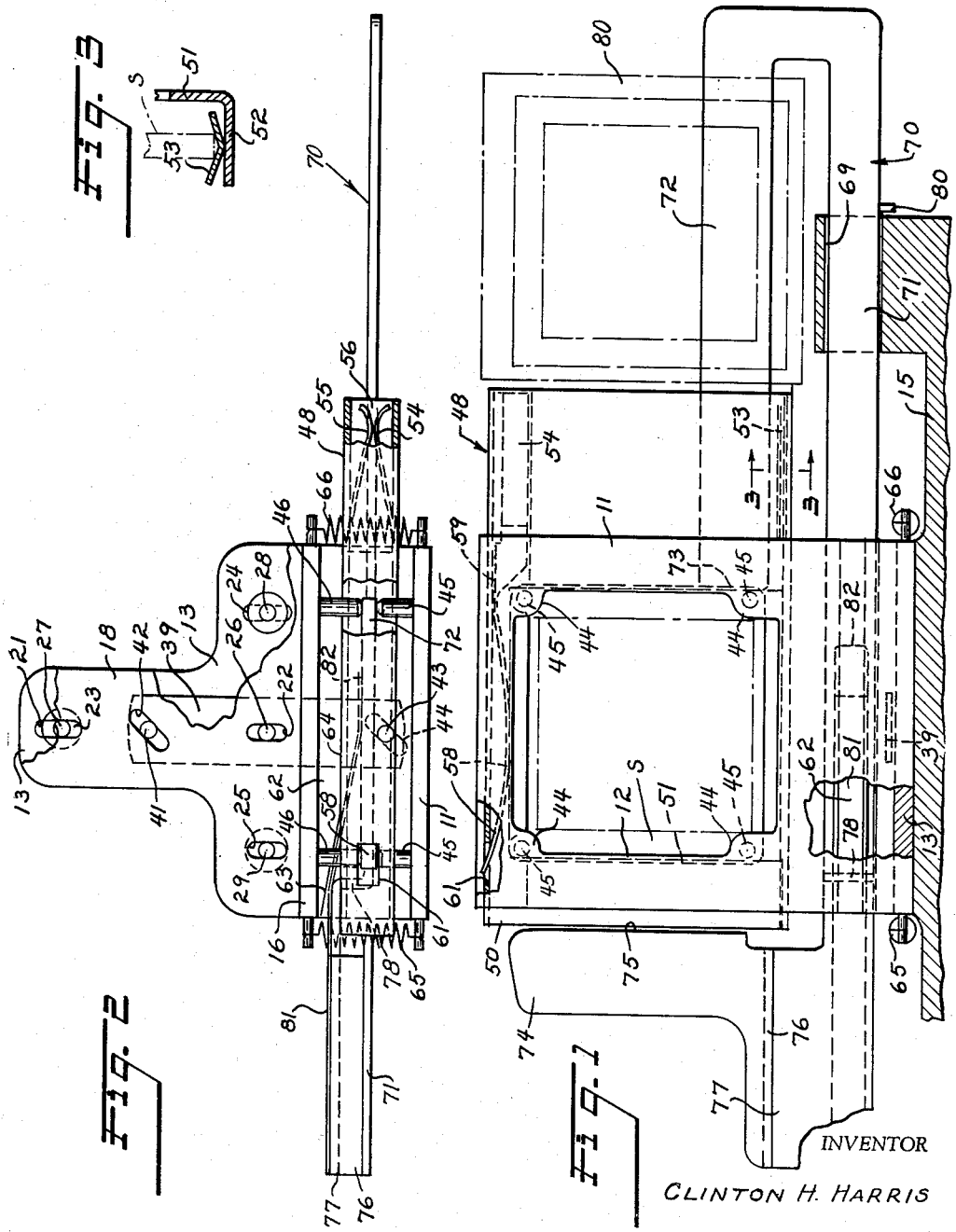
INVENTOR
CLINTON H. HARRIS
BY Strauch, Nolan & Neale
ATTORNEYS

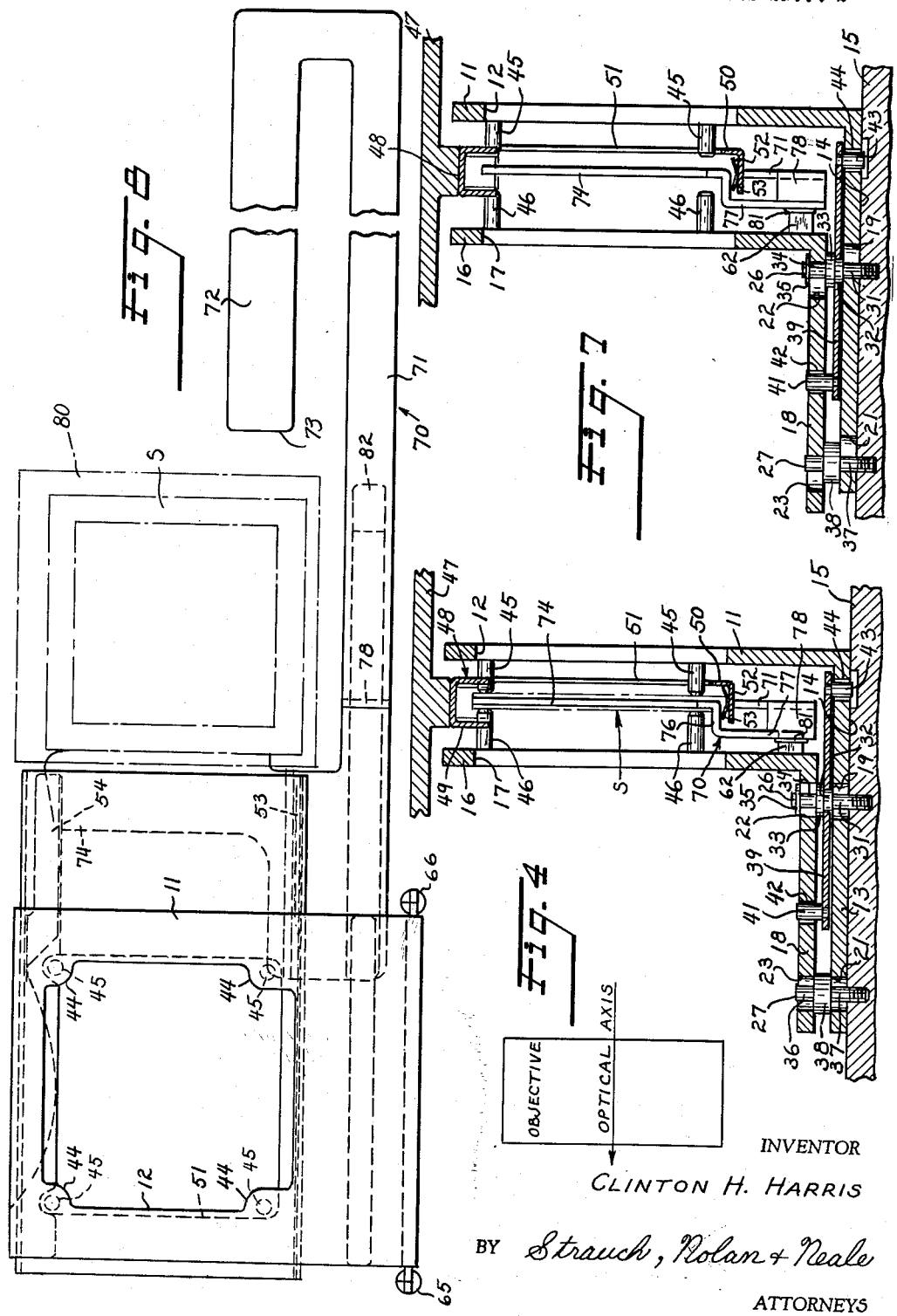

Dec. 17, 1963  C. H. HARRIS  3,114,285
AUTOMATIC SLIDE CENTERING
Filed May 29, 1957  3 Sheets-Sheet 3
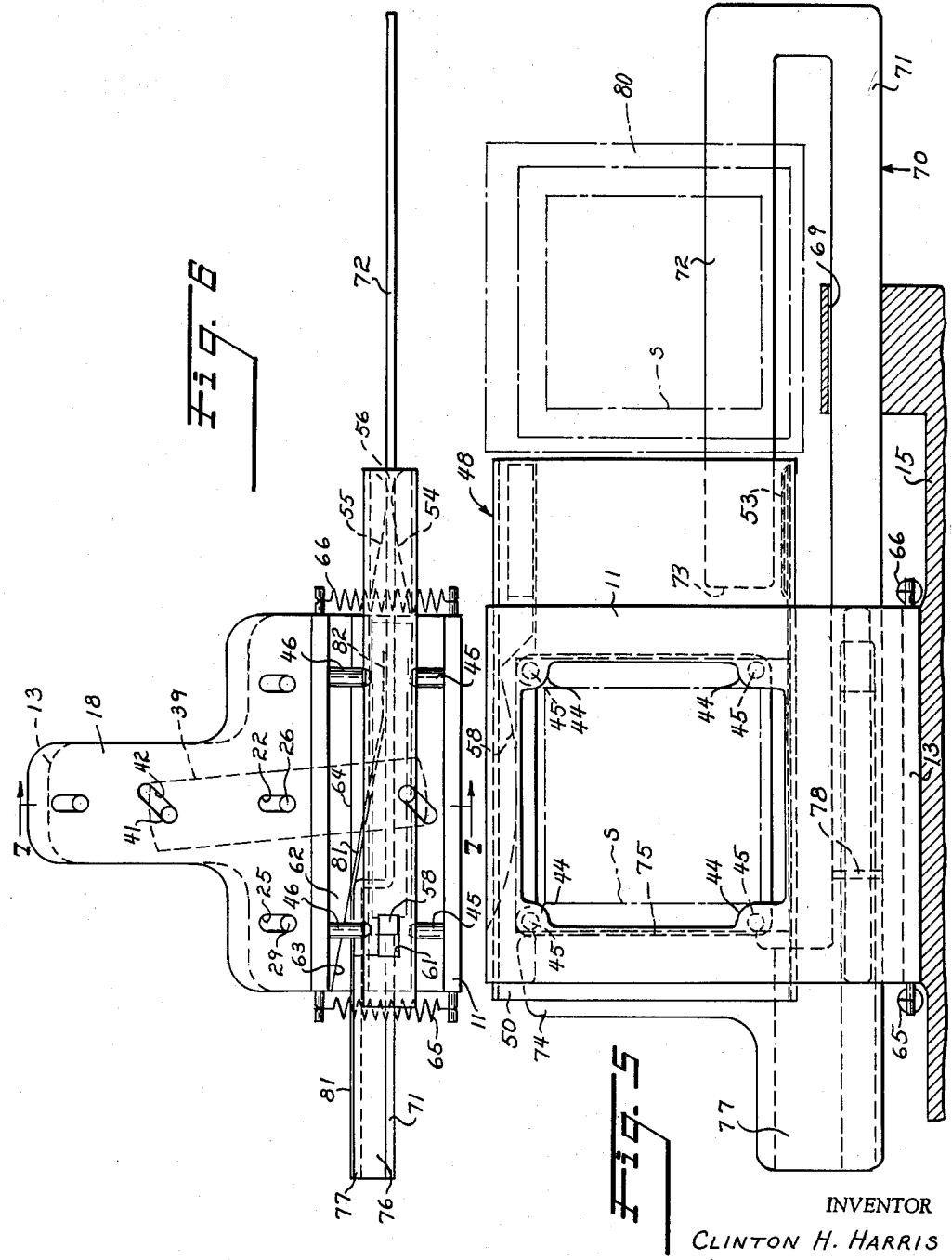
INVENTOR
CLINTON H. HARRIS
BY Strauch, Nolan + Neale
ATTORNEYS

United States Patent Office 3,114,285
Patented Dec. 17, 1963

3,114,285
AUTOMATIC SLIDE CENTERING
Clinton H. Harris, Ann Arbor, Mich., assignor, by mesne assignments, to Argus Incorporated, a corporation of Delaware
Filed May 29, 1957, Ser. No. 662,459
2 Claims. (Cl. 88—28)

This invention relates to the projection of slide transparencies and particularly to the accurate positioning of a slide to be projected in the optical path.

The projection of color transparencies such as the known 35 mm. Kodachrome slides is becoming increasingly popular, and automatic slide changers are being produced for speedily and regularly substituting one slide for another in the optical path. Due to the short distances involved and the optics of the projection system the axial positioning of the slide on the optical path is quite sensitive and therefore it is important if possible to locate each slide in the same relative position for projection to avoid constant refocusing. This is especially desirable where slides of different thicknesses such as the usual paper mounted type and the thicker glass enclosed type follow in succession.

Devices have been proposed whereby as each slide is inserted into the optical path it encounters a control member that automatically refocuses the objective to suit the slide thickness. Such devices can be made to operate satisfactorily but they are expensive, and since they require that the objective be mounted so as to be easily shifted axially there is considerable danger of accidental undesirable objective movement which latter may even arise from frame vibration caused by the fan motor.

The present invention contemplates solution of the problem in a different manner and involves the concept of equally relatively displacing both sides of the slide mounting receptacle in the optical path to automatically compensate for different slide thicknesses so that each slide will be centered in the same plane regardless of its thickness and correct focus maintained without displacing the objective lens.

The major object of this invention is to provide a novel slide holding and locating apparatus for use with a projection system; wherein the slides are automatically centered regardless of variations in their individual thicknesses so as to substantially eliminate refocusing as slides of different thickness are introduced into the projection path.

A further object of the invention is to provide a slide holding and locating apparatus wherein front and rear slide engaging members are mounted for movement toward and away from each other, such movement being controlled by a member that is shiftable to introduce a slide into or withdraw the slide from the space between said members.

A further object of the invention is to provide front and rear slide engaging members mounted for relative displacement and interconnected by motion transmitting linkage that is actuated by reciprocation of an associated slide pusher.

Further objects will appear as the description proceeds in connection with the appended claims and the annexed drawings wherein:

FIGURE 1 is a rear elevation of the slide centering apparatus according to a preferred embodiment of the invention partially broken away and sectioned to show detail;

FIGURE 2 is a top plan view showing the slide holding and locator plates and partially broken away and sectioned to show details;

FIGURE 3 is a fragmentary section on line 3—3 of FIGURE 1;

FIGURE 4 is a transverse section showing detail of the slide centering apparatus of FIGURES 1–3;

FIGURES 5 and 6 are respectively elevation and top plan views similar to FIGURES 1 and 2 respectively but showing the position of the parts after the locator plates have been separated and as the pusher starts to move the slide toward the magazine;

FIGURE 7 is a section on line 7—7 of FIGURE 6; and

FIGURE 8 is an elevation showing the pusher at its limit of stroke in the direction of shifting the slide to the magazine.

The slide S is the usual color transparency such as the glass or paper mounted Kodachrome transparency to be projected on a screen.

A vertical rear slide holding and locator plate 11 is formed with a rectangular projection aperture 12 and slide S is shown in projection position in the optical path before the aperture. Plate 11 has at its lower end an integral leg 13 that projects at right angles thereto and is formed with a flat bottom surface 14 slidable upon a stationary flat support 15.

A second vertical front plate 16 is parallel to front plate 11 with a rectangular projection aperture 17 of the same size and aligned with aperture 12. Plate 16 has at its lower end an integral flat leg 18 that extends at right angles in parallel vertically spaced relation to leg 13 of plate 11.

As shown in plan in FIGURE 2, the plate legs 13 and 18 are of the same size where coextensive. Leg 13 is formed with slide guide slots 19 and 21 that are located centrally and in the vertical plane containing the axis of projection through apertures 12 and 17, and just above identical similarly located slide guide slots 22 and 23 are formed in leg 18. Also each leg is provided with guide slots 24 and 25 located one above the other in the respective legs as shown in FIGURE 2. All eight slots are of the same size and are parallel in the direction of their lengths. Slots 19, 21, 22, 23 are longitudinally aligned, and slots 24, 25 are laterally aligned with superposed slots 19, 22 and equally spaced on opposite sides thereof.

Four fixed guide pins 26, 27, 28 and 29 are rigidly secured to the support 15, as by threaded attachment, and they extend up into the associated slots. Pin 26 has in succession a cylindrical lower section 31 slidably disposed in slot 19, an enlarged cylindrical section 32, a further enlarged cylindrical section 33 and an upper cylindrical shank 34 slidably disposed in slot 22. Shank 34 projects above slot 22 and has attached thereto a suitable fastener key 35 wider than slot 22. The pins 27, 28 and 29 are identical, and each is threaded or similarly rigid with support 15 with upper and lower shanks 36 and 37 slidably disposed in the respective upper and lower leg slots and an enlarged cylindrical spacer section 38 disposed between the legs.

Legs 13 and 18 are effectively maintained spaced by the spacers 38 that are appreciably wider than the slots and provide flat bearing faces for the legs. In effect the rear plate 16 is thus horizontally slidably mounted on the support 15 in spaced parallelism with front plate 11. In the space between the legs 13 and 18 a flat link 39 is horizontally disposed provided at its rear end with a rigid cylindrical pin 41 extending upwardly to slidably enter a slot 42 in leg 18, and at its front end with a downwardly extending rigid cylindrical pin 43 slidably received in a slot 44 in leg 13. Link 39 is freely pivoted halfway intermediate its ends on the enlarged cylindrical section 32 of pin 26 so that it may turn about the axis of pin 26. Formation 33 on the pin 26 traps the link 39 so that the latter may swing only in a plane.

As shown in FIGURE 2, slots 42 and 44 are similarly inclined at 45° to the vertical plane through the projection axis and passing through slots 19, 21, 22, 23; and they are of about the same size as the other slots. The pins 41 and 43 are located equally distant from the axis of pin 26 which serves as a pivot for the link, and when the link 39 is in the FIGURE 2 position pins 41, 43 are centered in their respective slots and aligned longitudinally with pins 26 and 27.

Referring to FIGURES 1 and 4, the corners of apertures 12 and 17 are bridged as at 44 for rigidly mounting horizontally extending slide contacting studs 45 and 46 respectively. There are four such parallel studs of the same length on each plate, one engaging each corner of the slide in projection position, and in the illustrated embodiment the rear set of studs 46 is longer to clear the slide pusher later described.

Referring to FIGURE 4 an upper rigid part of the support 15 designated at 47 extends above the plates and a sheet metal slide guide channel 48 is fixed thereto as by spot welding. The channel 48 opens downwardly, being disposed about midway between the plates in the FIGURE 1–3 position and has a short vertical rear leg 49 and a long vertical front leg 50 parallel to the plates 11 and 16 and leg 49 provided with a large rectangular aperture 51 on the projection axis.

At its lower end channel leg 50 is bent rearwardly at right angles to provide a support shelf or flange 52 (FIGURE 4) for the slide to be projected. A V-shaped guide strip 53 is secured along the upper side of flange 52 at the slide entrance side and is shown in FIGURE 3. Within the upper end of channel 48 at the slide entrance end springs 54 and 55 extend toward each other to define a resilient slide admission and centering mouth 56.

A downwardly bowed leaf spring 58 is fixed within channel 48 at one end at 59 and its other end extends freely through an aperture 61 as shown in FIGURE 1 so that this spring may freely compress when a slide enters the projection path.

At its lower end front plate 16 is formed with a rigid transverse rib 62 that projects toward the rear plate and is formed with an inclined cam face 63 and a flat face 64 parallel to plate 16.

At their lower ends plates 11 anl 16 are interconnected by parallel tension springs 65 and 66 that normally urge them toward each other, and when a slide is in projection position as in FIGURE 4 the stud sets 45 and 46 engage opposite sides of the slide to grip and locate the slide properly axially in the light path. The usual projector objective lens (not shown) is located in the optical path to the left in FIGURE 4.

A slide pusher 70 is mounted in the assembly for introducing and removing a slide with respect to the FIGURE 1 projection position. Pusher 70 comprises a straight flat base 71 that is mounted for slidable movement in a frame guide groove 69 at right angles to the projection path and has a reversely bent end flat arm 72 which during operation is adapted to move to the left in FIGURE 1 from a position where its end 73 engages a slide in magazine 80 and pushes it into the projection position of FIGURE 1.

The other end of pusher 70 has an upstanding flat post 74 in the vertical plane of base 71 and having a vertical edge face 75 adapted to engage a slide and move it from the projection position of FIGURE 1 back to the magazine. As illustrated in FIGURE 4 the post 74 is connected to base 71 by an integral horizontal section 76 of sufficient extent to locate the post centrally with respect to channel 48, an integral vertical web 77 parallel to base 71 and an integral horizontal section 78.

Referring to FIGURES 1 and 2, a strip of spring metal 81 is suitably secured to the pusher on the rear side of web 77 and extends laterally of the projection path at the level of cam rib 62. Spring 81 is a free flexible element where it passes the bend at pusher section 78 and it is adapted to engage slidably cam 62 at an intermediate portion before its terminal section 82 slidably bears on the rear side of pusher base 71.

*Operation*

Starting with the parts in the position shown in FIGURES 1–4, wherein the slide S is in projection position, the pusher 70 is moved to the right in FIGURE 1 to displace the slide into the magazine. In the FIGURE 1 condition the plates 11 and 16, which are essentially freely floating within limits defined by their pin and slot mountings to the support, are urged together so that slide S is centered on a vertical plane that is at right angles to the optical path.

As pusher 70 moves to the right in FIGURE 1 the edge 75 after a small travel engages and starts to shift the slide S toward the magazine. The relation of parts at this point of contact between the pusher edge 75 and slide S is illustrated in FIGURES 5 and 6. During this small travel period the spring 81 slidably engages and moves along the inclined smooth cam face 63 and the front plate 16 is thereby automatically shifted forwardly on and parallel to the optical axis. As plate 16 moves forwardly, guided by its slot and pin mounting, engagement of slot 42 and pin 41 results in link 39 rotating counterclockwise about its pivot 32 toward the position shown in FIGURE 5, and this in turn through pin 43 and slot 44 caused a corresponding displacement of rear plate 11 that is upon and on the optical axis and equal to the displacement of plate 16. Thus plates 11 and 16 are first quickly equally and oppositely separated to release the slide from the grip of studs 45 and 46 before pusher edge 75 engages the slide to start moving it, and the plates 11 and 16 remain held apart in their separated position during all the remainder of the travel of the pusher to the right in FIGURE 1 and part of the return movement later described because spring 81 is sliding along the smooth flat face 64 that is normal to the optical axis. As soon as it starts to move toward the magazine the slide enters the bottom V-guide 53 and the top resilient centering throat 56 which accurately guide it back to the magazine. When the pusher reaches the position shown in FIGURE 8, the slide is located in the magazine and the arm 72 is out of the magazine.

Where the slide changer is automatic, a suitable indexing mechanism synchronized with the transverse movement of pusher 70 now shifts the magazine one unit parallel to the optical axis to dispose a fresh slide in lateral alignment with arm 72 which is now ready for displacement to the left to move that new slide into the projection path. No automatic means for shifting pusher 70 on the magazine is here shown because such is not part of the present invention. Provision is made to first shift the pusher to the left a short distance in FIGURE 1 to insure that edge 75 is free of the magazine.

As the end 73 of arm 72 shifts the new slide out of the magazine the slide enters the entrance mouth of the channel 48, the lower edge of the slide being centered by the V-channel at 53 and the upper end of the slide entering the resilient mouth 56 which cooperates with the lower guide to provide steady smooth entry of the slide into the space between separated plates 11 and 16. As the slide enters this space its lower edge slides over the smooth upper surface of ledge 52 and its upper edge slides under and compresses spring 58 which urges it lightly downwardly against ledge 52. The resilient grip of mouth 56 prevents undesired turning of the slide until it is well under the control of spring 58. Finally, as the pusher regains the FIGURE 1 position the slide is now in projection position and the spring 81 has passed down cam slope 63 which permits the springs 65 and 66 to pull the plates 11 and 12 toward each other until the studs 45 and 46 engage opposite sides of the slide and hold it tight and upright accurately normal to the projection path. A suitable stop projection such as at 80 on pusher base 71 limits the slide inserting movement of the pusher.

The invention therefore provides a slide holding and locating apparatus disposed on the optical axis which always locates the center of the introduced slide in the same plane normal to the axis of projection regardless of slide thickness.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a projector slide locating and holding apparatus, a support, spaced slide engaging and holding members relatively movably mounted on said support, a slide pusher mounted on said support for movement transversely of the projection axis, and means operably interconnecting said members and slide pusher for substantially equally and oppositely separating said members during part of the movement of said pusher in one direction and for substantially equally moving said members toward each other during part of the movement of the pusher in the other direction so that slides of different thickness are automatically axially centered in said apparatus with respect to a predetermined plane normal to the projection axis, and means at one side of said members for centering with said plane and guiding a slide passing into or out of the space between said members, said last means comprising a V-shaped guide for the lower part of the moving slide and a resilient centering mouth embracing the upper part of the moving slide.

2. In a slide locating and holding apparatus, a support, spaced front and rear slide engaging members mounted on said support for relative parallel displacement toward and away from each other, said members having superposed spaced parallel projections, a link freely pivoted intermediate its ends in the space between said projections and having slide pivot connections at opposite ends to said projections, resilient means urging said members toward each other, a slide pusher reciprocable normally to the direction of displacement of said members, and means on said pusher engaging at least one of said members for effecting separation of said members when the pusher is moved in one direction.

References Cited in the file of this patent

UNITED STATES PATENTS

| 2,165,419 | Schubert | July 11, 1939 |
| 2,335,326 | Walter | Nov. 30, 1943 |
| 2,748,653 | Pollan et al. | June 5, 1956 |

FOREIGN PATENTS

| 297,899 | Switzerland | June 16, 1954 |
| 729,514 | Germany | Dec. 17, 1942 |